United States Patent [19]

Yamanishi et al.

[11] Patent Number: 4,655,545
[45] Date of Patent: Apr. 7, 1987

[54] GLASS FIBER FOR OPTICAL TRANSMISSION

[75] Inventors: Toru Yamanishi; Yuji Kameo; Masaaki Yoshida; Masao Yuto; Chihaya Tanaka, all of Kanagawa, Japan

[73] Assignee: Sumitomo Electric Industries, Ltd., Tokyo, Japan

[21] Appl. No.: 568,563

[22] Filed: Jan. 6, 1984

[30] Foreign Application Priority Data

Jan. 6, 1983 [JP] Japan ................................. 58-197

[51] Int. Cl.$^4$ ............................................... G02B 6/22
[52] U.S. Cl. .............................. 350/96.34; 350/96.29
[58] Field of Search ........................... 350/96.29, 96.34

[56] References Cited

U.S. PATENT DOCUMENTS

| 3,020,165 | 2/1962 | Davis | 350/96.29 X |
|---|---|---|---|
| 3,841,882 | 10/1974 | Wolf | 350/96.34 X |
| 3,980,390 | 9/1976 | Yamamoto et al. | 350/96.34 X |
| 4,344,669 | 8/1982 | Uchida et al. | 350/96.34 X |
| 4,367,013 | 1/1983 | Guerder et al. | 350/96.34 |
| 4,367,918 | 1/1983 | Pinnow | 350/96.34 X |

FOREIGN PATENT DOCUMENTS 1524316 9/1978 United Kingdom .

*Primary Examiner*—William L. Sikes
*Assistant Examiner*—Akm E. Ullah
*Attorney, Agent, or Firm*—Sughrue, Mion, Zinn, Macpeak & Seas

[57] ABSTRACT

A glass fiber for optical transmission comprising a glass fiber having provided thereon a first coating layer of a hardened resin and a second fluorine-containing resin layer formed by extrusion molding is disclosed. At least one of the first and second layers contains an adsorbable solid powder which is capable of adsorbing fluorine gas and/or hydrofluoric acid generated from the fluorine-containing resin during the extrusion molding. The glass fiber has an improved mechanical strength without adversely affecting transmission properties of the glass fiber.

9 Claims, No Drawings

GLASS FIBER FOR OPTICAL TRANSMISSION

FIELD OF THE INVENTION

This invention relates to a glass fiber for optical transmission (hereinafter referred to as optical fiber) and, more particularly, to an optical fiber having been extrusion coated with a fluorine-containing resin which does not cause deterioration of properties of an optical fiber.

BACKGROUND OF THE INVENTION

A typical conventional coating structure of optical fiber is a so-called two-layered coating structure composed of a relatively thin baked layer and an extrusion coating layer as proposed in U.S. Pat. No. 3,980,390 (corresponding to Japanese Patent Publication (Unexamined) No. 125754/1975). The coating materials conventionally used for the baked layer and the extrusion coating layer include silicone resins, epoxy resins, urethane resins, polyamide resins (nylon), polyethylene, and the like. Of these coating materials, thermoplastic resins used for the extrusion coating layer have low melting points and undergo remarkable deterioration due to oxidation at high temperatures, and only fluorine-containing resins that withstands the use at high temperatures of 150° C. or more for long periods of time have been employed as an extrusion coating layer for, in particular, so-called heat resistant coated optical fibers.

According to studies of the present invention, however, it was found that optical fibers in which a fluorine-containing resin is used as an extrusion coating layer have mechanical strength much lower than those coated with polyamides (nylon), polyethylene, etc. as an extrusion coating layer, and hence the optical fibers coated with the fluorine-containing resin cannot be put into practical use. For example, the present inventors have found that optical fiber consisting of a glass fiber having an outer diameter of 125 $\mu$m, a baked silicone layer provided thereon in a thickness of about 150 $\mu$m and an extrusion coating layer of nylon-12 in a thickness of 250 $\mu$m has an average strength of 6.2 Kg, whereas the optical fiber having the same structure as above but having an extrusion coating layer of ETFE (ethylene-tetrafluoroethylene copolymer) in a thickness of 250 $\mu$m in place of the nylon-12 layer has an average tensile strength of 3.6 Kg.

The present inventors intensively investigated the above-described decrease in the mechanical strength of optical fibers which is coated with fluorine-containing resins and, as a result, have found that such decrease in the mechanical strength is ascribed to fluorine gas or hydrofluoric acid generated at the time of melt-extrusion of a fluorine-containing resin and completed the present invention.

More specifically, it is believed that fluorine gas of hydrofluoric acid generated during the extrusion coating passes through a first baked layer and reaches surfaces of glass fibers to erode the glass surfaces or destroy chemical bonding between the glass surfaces and the baked layer thereby causing the above-described reduction in mechanical strength. Further, it has been found that the reduction of mechanical strength of the optical fiber having an extrusion coating layer of a fluorine-containing resin is also observed when the optical fiber is irradiated with electron beams. This phenomenon is also considered to be caused by fluorine gas or hydrofluoric acid generated by the electron beam radiation.

According to the studies of the present inventors, in order to prevent or minimize generation of fluorine gas or hydrofluoric acid during melt-extrusion of fluorine-containing resins, it is necessary to lower the extrusion temperature of the fluorine-containing resin to about a melting point of the fluorine-containing resin. At such a low extrusion temperature, the viscosity of the resin during extrusion increases thereby leaving a high residual strain in the coating after extrusion molding. The residual strain then causes shrinkage of coating materials with the passage of time, which results in increase of transmission loss due to so-called microbending.

As a result of further investigation, it has been found that when an adsorbable solid powder such as titanium oxide, calcium carbonate and the like is present in the fluorine-containing resin, fluorine gas or hydrofluoric acid that is generated during melt-extrusion of the resin is adsorbed to the solid powder and is prevented from reaching the glass fiber surface thereby causing no reduction in the mechanical strength of the optical fibers.

The present invention has been completed based on the above-described findings and provides a glass fiber for optical transmission (hereinafter, optical fiber) having an improved mechanical strength and comprising a glass fiber having provided thereon a first coating layer of a hardened resin and a second fluorine-containing resin layer formed by extrusion molding, at least one of the first and second layers containing an adsorbable solid powder in an amount of 0.05 to 20% by weight based on the weight of the first or second layer.

SUMMARY OF THE INVENTION

A primary object of the present invention is to provide an optical fiber having an improved mechanical strength.

Another object of the present invention is to provide an optical fiber having an extrusion coating layer which does not adversely affect the transmission properties of the optical fiber.

A further object of the present invention is to provide an improved optical fiber having an extrusion coating layer of a fluorine-containing resin.

A still further object of the present invention is to provide an optical fiber having an improved mechanical strength comprising a glass fiber, a first coating layer provided on the glass fiber, and a second coating layer of a fluorine-containing resin, at least one of the first and second coating layers containing an adsorbable solid powder.

DETAILED DESCRIPTION OF THE INVENTION

The term "adsorbable solid powder" as used herein means a solid powdery material which is capable of absorbing fluorine gas and/or hydrofluoric acid generated from a fluorine-containing resin.

The adsorbable solid powder which can be used in the present invention includes those having a melting point or decomposition point of 350° C. or more, such as metal oxides such as zinc oxide, aluminum oxide, titanium oxide (TiO, $TiO_2$, $Ti_2O_3$), magnesium oxide, calcium oxide, silicon oxide, iron oxide, boron oxide ($B_2O_3$), barium sulfate, zirconium oxide ($ZrO_2$), etc.; carbonates such as calcium carbonates, etc.; carbon powder; activated carbon powder; and the like. Preferred examples of adsorbable solid powders are boron oxide ($B_2O_3$), zirconium oxide ($ZrO_2$), barium sulfate ($BaSO_4$), titanium dioxide ($TiO_2$), calcium carbonate ($CaCO_3$) and silicon dioxide ($SiO_2$), and particularly preferred powders are $CaCO_3$, $B_2O_3$, $BaSO_4$ and $ZrO_2$. These solid powders may be used alone or in combination thereof. Many of these solid powders have been used as inorganic pigments so that they can also serve as pigments in the present invention, if desired.

The amount of the adsorbable solid powder to be incorporated into the coating layer should be at least 0.05% by weight based on the weight of the coating layer to which the powder is added from the standpoint of a adsorption effect and not more than 20% by weight based on the weight of the coating layer from the standpoint of not causing any adverse effects on properties of the coating layer. A preferred amount of the adsorbable solid powder is 0.05 to 10%, and the most preferred amount is 0.1 to 5%, based on the weight of the coating layer to which the powder is added.

These adsorbable solid powders can be added to the first coating layer or the second coating layer or both layers, preferably in both layers. When the powder is added to both the first and second layers, the amount of the powder in each layer should not exceed 20% by weight based on the weight of the respective coating layer.

The particle size of adsorbable solid powders is not an important factor in the present invention, but preferably from about 5 to about 40 μm.

The materials to be used as a first coating layer provided under the fluorine-containing resin-coated layer according to the present invention are not particularly limited and any materials of thermosetting or ultraviolet-hardenable materials having a viscosity of 1000 to 10,000 cps at room temperature can be used. Preferred examples of these materials include silicon resins, epoxy resins, urethane resins, polyesters, polybutadiene and modified resins thereof. Particularly preferred examples of the first layer includes a silicon resin, an epoxy acrylate resin, a urethane acrylate resin, a butadiene acrylate resin and the like. The first layer can be a single coating layer or two or more layers composed of the same or different materials. When the first layer is composed of a plurality of layers, the adsorbable solid powder can be added in either of the first layers or in both layers.

The first layer preferably has a thickness of about 30 to 150 μm.

The materials to be used as a second layer are fluorine-containing resins such as tetrafluoroethylene polymers, tetrafluoroethylene-hexafluoropropylene copolymers, ethylene-tetrafluoroethylene copolymers (ETFE), perfluoroalkoxyethylene-tetrafluoroethylene copolymers (PFA), chlorotrifluoroethylene polymers, vinylidene fluoride polymers, etc. Preferred materials are ethylene-tetrafluoroethylene copolymers and perfluoroalkoxyethylene-tetrafluoroethylene copolymer. ETFE has a specific gravity of 1.73 to 1.75 (ASTM D792), a melting point of 255° to 270° C., a melt viscosity of $10^4$ to $10^5$ poise (at 300° to 330° C.), a tensile strength of 410 to 470 Kg/cm$^2$ at 23° C. and no break in the Izod impact test (ASTM D256), and PFA has a specific gravity of 2.13 to 2.16 (ASTM D792), a melting point of 302° to 310° C., a tensile strength at 315 Kg/cm$^2$ at 23° C. and no break in the Izod impact test (ASTM D256).

The glass fibers used in the present invention can be those produced from a quartz glass as main component (with a small amount of dopants) by drawing which is well known in the art, for example, as disclosed in "*Optical Communication Handbook*", Section 5.3 (Asakura Publishing Co., Japan). These fibers generally have an outer diameter of from about 100 μm to about 150 μm, preferably 120 μm to 140 μm, more preferably 125 μm or 140 μm which is now recognized as standard.

The second layer preferably has a thickness of 0.1 to 0.25 mm.

In producing the optical fiber according to the present invention, the adsorbable solid powder is incorporated into the resin for the first layer or the fluorine-containing resin for the second layer, or both, and the resulting resin composition is kneaded so as to disperse the powder uniformly. The first layer can be formed by dipping or passing the glass fiber into a resin for the first layer, before contacting the drawn glass fiber with any solid material, and the coated fiber is hardened, as disclosed in "*Optical Communication Handbook*", Section 5.3C (Asakura Publishing Co., Japan). The second layer can be formed by extrusion molding a molten fluorine-containing resin over the first layer through a die, which is well known in the art. For example, the glass fiber having a hardened first layer is fed from a supply stand while controlling its tension by dancer rolls and supplied to a drawdown type die where the fiber is coated by extrusion molding without loading a pressure of the resin on the fiber. The outer diameter of the coated fiber is controlled by monitoring the outer diameter immediately after coating by a non-contact type "D" monitor and feeding back a signal of the determined diameter to the extruder so as to control a screw rotation of the extruder. After coating, the resulting optical fiber is passed through a cooling bath and capstans, and wound-up on a bobbin by a winder where winding tension is controlled by dancer rolls.

The resulting optical fiber generally has an outer diameter of 0.5 to 1.0 mm.

The present invention will now be illustrated in greater detail with reference to examples, but it should be understood that the present invention is not limited to these examples.

EXAMPLE 1

An optical fiber comprising mainly quartz glass and having an outer diameter of 125 μm was drawn and, before contacting with any solid materials, a silicone resin of two-liquid room temperature-hardening type containing 5 wt% of silicon dioxide powder (average particle size: 5 to 40 μm) was coated on the drawn fiber in a thickness of 150 μm, followed by hardening. The resulting silicone-coated fiber was then coated with an ethylene-tetrafluoroethylene copolymer by extrusion molding so as to have an outer diameter of 0.9 mm.

EXAMPLE 2

An optical fiber comprising mainly quartz glass and having an outer diameter of 125 μm was drawn and, before contacting with any solid materials, a silicone resin of two-liquid room temperature-hardening type containing no adsorbable solid powder was coated on the drawn fiber in a thickness of 50 μm, followed by being hardened. Then, the same silicone resin as used above but containing 5% by weight of silicon dioxide powder (average particle size: 5 to 40 μm) was coated over the above silicone-coated fiber in a thickness of 100 μm, followed by being hardened. The resulting silicone coated optical fiber was further coated with a tetrafluoroethylene-hexafluoropropylene copolymer by extrusion molding so as to have an outer diameter of 0.9 mm.

COMPARATIVE EXAMPLE 1

An optical fiber comprising mainly quartz glass and having an outer diameter of 125 μm was drawn and, before contacting with any solid materials, a silicone resin of two-liquid room temperature-hardening type containing no silicon dioxide was coated on the drawn fiber in a thickness of 150 μm, followed by being hardened. The resulting silicone-coated fiber was then coated with an ethylene-tetrafluoroethylene copolymer by extrusion molding so as to have an outer diameter of 0.9 mm.

The mechanical strength of the fluorine-containing resin-coated optical fiber obtained in each of Example 1, Example 2 and Comparative Example 1 was determined by tensile testing (sample length: 20 m; $\eta=20$) and was found to be 6.2 Kg, 6.1 Kg, and 3.4 Kg, respectively. These results clearly demonstrate that the adsorbing solid powder used in the present invention is very effective for adsorbing fluorine gas or hydrofluoric acid.

EXAMPLE 3

An optical fiber comprising mainly quartz glass and having an outer diameter of 125 μm was drawn and, before contacting with any solid materials, a silicone resin of two-liquid room temperature-hardening type was coated on the drawn fiber in a thickness of 150 μm, followed by being hardened. The resulting silicone-coated fiber was then coated with a composition consisting of an ethylene-tetrafluoroethylene copolymer and 1.0% by weight of titanium dioxide (titanium white) (average particle size: 5 to 40 μm) by extrusion molding so as to have an outer diameter of 0.9 mm.

EXAMPLE 4

An optical fiber comprising mainly quartz glass and having an outer diameter of 125 μm was drawn and, before contacting with any solid materials, epoxy acrylate of ultraviolet hardening type was coated thereon in a thickness of 150 μm, followed by being hardened. The resulting epoxy acrylate-coated optical fiber was then coated with a composition consisting of a tetrafluoroethylene-hexafluoropropylene copolymer and 0.5% by weight of calcium carbonate (average particle size: 5 to 40 μm) by extrusion so as to have an outer diameter of 0.9 mm.

EXAMPLE 5

An optical fiber comprising mainly quartz glass and having an outer diameter of 125 μm was drawn and, before contacting with any solid materials, a silicone resin of two-liquid room temperature-hardening type containing 5 wt% of silicon dioxide powder (average particle size: 5 to 40 μm) was coated on the drawn fiber in a thickness of 150 μm, followed by hardening. The resulting silicone-coated fiber was then coated with an ethylene-tetrafluoroethylene copolymer containing 1.0% by weight of titanium dioxide (titanium white) (average particle size: 5 to 40 μm) by extrusion molding so as to have an outer diameter of 0.9 mm.

COMPARATIVE EXAMPLE 2

The same silicon-coated optical fiber as used in Comparative Example 1 was extrusion coated with an ethylene-tetrafluoroethylene copolymer containing no solid powder so as to have an outer diameter of 0.9 mm.

The mechanical strength of the fluorine-containing resin-coated optical fiber obtained in each of Examples 3, 4 and 5 and comparative Example 2 was determined by tensile testing (sample length: 20 m; $\eta=20$) and was found to be 6.6 Kg, 6.4 Kg, 6.6 Kg and 3.3 Kg, respectively. These results clearly demonstrate that the adsorbable solid powder used in the present invention is very effective for adsorbing fluorine gas or hydrofluoric acid.

While the present invention has been described in detail and with reference to specific embodiments thereof, it will be apparent to one skilled in the art that various changes and modifications can be made therein without departing from the spirit and scope thereof.

What is claimed is:

1. A glass fiber for optical transmission comprising a glass fiber having provided thereon a first coating layer of a hardened resin and a second fluorine-containing resin layer formed by extrusion molding, wherein said fluorine-containing resin is selected from the group consisting of tetrafluoroethylene polymers, tetrafluoroethylene-hexafluoropropylene copolymers, ethylene-tetrafluoroethylene copolymers, perfluoroalkoxyethylene-tetrafluoroethylene copolymers, chlorotrifluoroethylene polymers and vinylidene fluoride polymers, and said second layer contains an adsorbable solid powder.

2. A glass fiber for optical transmission according to claim 1, wherein said adsorbable solid powder is present in an amount of from 0.05 to 20% by weight based on the weight of the second layer.

3. A glass fiber for optical transmission as claimed in claim 1, wherein the adsorbable solid powder has a decomposition point of 350° C. or more.

4. A glass fiber for optical transmission as claimed in claim 2, wherein the adsorbable solid powder is selected from the group consisting of zinc oxide, aluminium oxide, titanium oxide, magnesium oxide, calcium oxide, silicon oxide, iron oxide, boron oxide, barium sulfate, zirconium oxide, calcium carbonate, carbon powder, activated carbon powder and a mixture thereof.

5. A glass fiber for optical transmission as claimed in claim 1, wherein said first layer is a single layer of the material selected from the group consisting of silicone resins, epoxy resins, urethane resins, polyester, polybutadiene and modified resins thereof.

6. A glass fiber for optical transmission as claimed in claim 4, wherein said adsorbable solid powder is selected from the group consisting of $SiO_2$, $TiO_2$, $CaCO_3$, $B_2O_3$, $ZrO_2$, $BaSO_4$ and a mixture thereof.

7. A glass fiber for optical transmission as claimed in claim 1, wherein said fluorine-containing resin is an ethylene-tetrafluoroethylene copolymer or a perfluoroalkoxyethylene-tetrafluoroethylene copolymer.

8. A glass fiber for optical transmission as claimed in claim 5, wherein said first layer is composed of a material selected from the group consisting of a silicone resin, an epoxy acrylate resin, a urethane acrylate resin and a butadiene acrylate resin.

9. A glass fiber for optical transmission as claimed in claim 1, wherein said first layer comprises multiple layers of the material selected from the group consisting of silicone resins, epoxy resins, urethane resins, polyester, polybutadiene and modified resins thereof.

* * * * *